3,282,725
SOLVENT REMOVAL FROM A COATED LACQUER FILM
Roelof van Zalinge, Palestro, Pavia, Italy, assignor to Algemene Kunstzijde Unie, N.V., Arnhem, Netherlands, a corporation of the Netherlands
Filed May 16, 1963, Ser. No. 280,826
Claims priority, application Netherlands, May 28, 1962, 279,000
4 Claims. (Cl. 117—64)

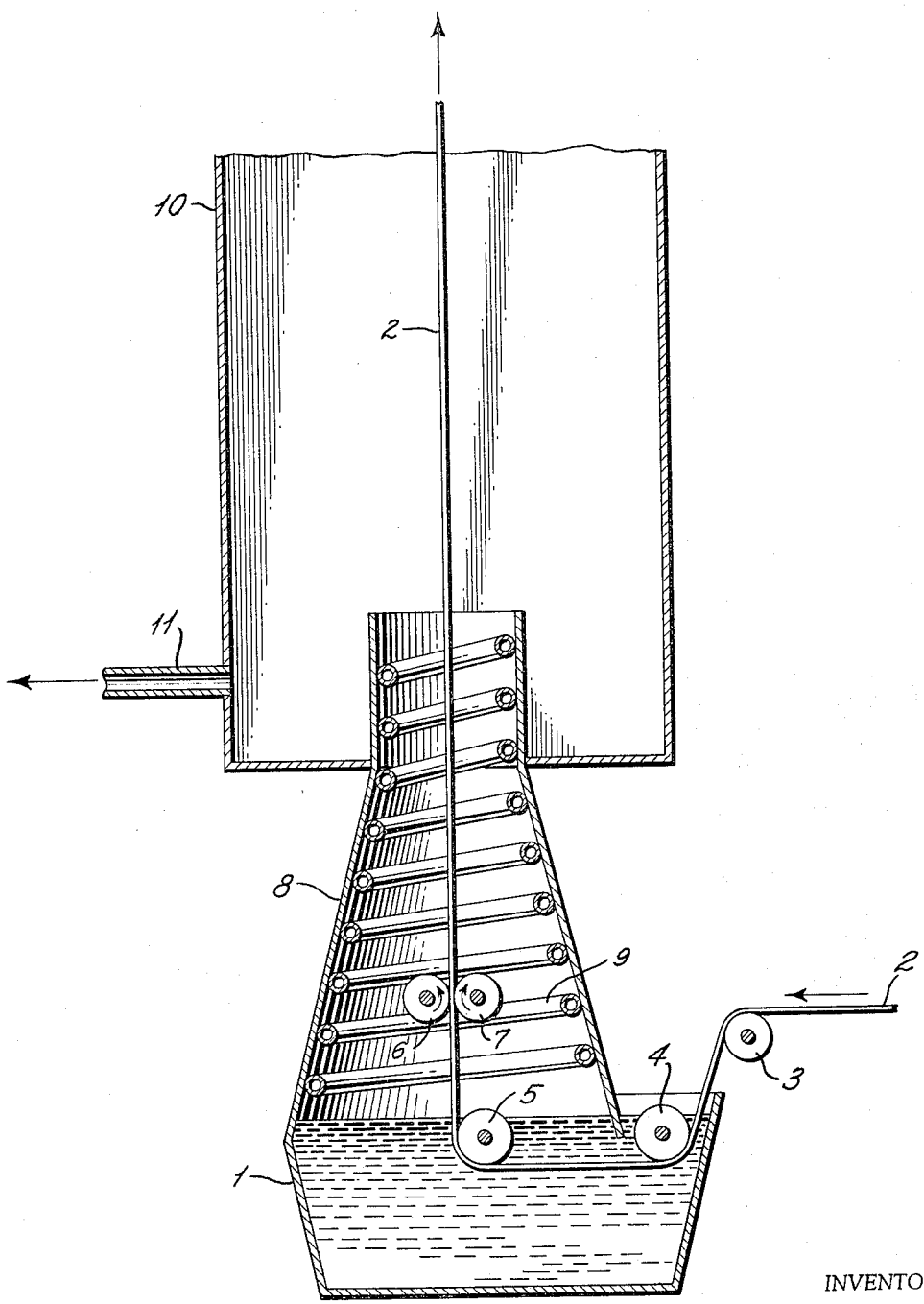

This invention relates to a method and apparatus for the coating of film with lacquer and to the film thus coated.

The coating of films with lacquer has been a practice long known in the prior art. Though the type of film treated may vary widely the application of a lacquer coating has been applied, particularly with regard to films based on regenerated cellulose. Just as the type of film may be varied widely, so may the nature of the lacquer being applied. Use is often made of nitro cellulose lacquer, which while dissolved in a mixture of ethyl acetate and toluene is applied to the film at a temperature of about 40° C., or of a lacquer based on a polyvinylidene chloride which, while dissolved in a mixture of 65% methyl ethyl ketone and 35% toluene, is applied to films at about 70° C.

A method for applying the lacquer employed in the past has been to simply guide the film in a continuous manner through a bath consisting of a diluted lacquer solution and thereafter drying the coated film in a drying shaft by blowing heated air along or against it. However, employing this system, it was found that because of the rapid evaporation of solvent the coating became dull and its thickness became non-uniform. These disadvantages appear to have resulted from the fact that the rapid evaporation of the solvent produces a decrease in temperature, which makes it difficult for the viscous lacquer solution to spread uniformly over the film and causes premature coagulation of certain lacquer components.

To overcome these disadvantages it has been proposed to modify the previous method by passing film, after it has left the lacquer bath and before warm air is blown against it, through a zone in which excessive ventilation is avoided and in which an atmosphere is maintained containing solvent vapor in a concentration higher than that maintained in the drying shaft. Though this modification has resulted in some improvement in quality of the coated film, it has still not resulted in a completely satisfactory product.

It has also been proposed to overcome the defects of the prior art method by diluting the lacquer to a greater degree, but this method is not desirable since diluting the lacquer requires more energy of evaporation and calls for larger regeneration capacity.

It is an object of the present invention to provide an improved method and apparatus for coating films with lacquer whereby the defects of the prior art are avoided.

It is a further object of this invention to provide an apparatus and method for coating film with lacquer whereby there is obtained a very clear uniformly coated film.

It is a further object of this invention to provide a method for the coating of films with lacquer in a continuous manner which permits substantial increase in the speed of film being coated.

It is a further object of this invention to provide a method and apparatus for coating film with lacquer whereby one may utilize more concentrated lacquer solutions so that it is possible to economize on the cost of energy required for solvent evaporation.

It is a further object of this invention to provide a film coated with lacquer produced according to the method of this invention and possessing a clear and uniform coating.

Other objects and advantages of this invention will become apparent from the following disclosure.

According to the process of this invention the film to be coated is passed through a bath containing a diluted lacquer solution and thereafter guided through a zone in which excessive ventilation is avoided and in which an atmosphere is maintained contaning solvent vapor at a concentration higher than that maintained in the drying shaft and in which said zone the atmosphere is maintained at an adjustable temperature which is higher than that of the lacquer bath and lower than that of the heated drying air which is subsequently directed along or against the coated film.

Without being bound by any theory, it would appear that the improved former method of passing the freshly coated film through a zone which reduces too rapid evaporation of the solvent still resulted in a cooling of the solvent due to the evaporation which did occur, thus resulting in the dull coating. By the present method this cooling due to evaporation is counteracted by supplying additional heat to the atmosphere surrounding the film. Moreover, by the method of this invention, the elevated temperature of the fresh coating, which is practically in equilibrium with the vapor of its solvent, promotes the uniform spreading of the lacquer and the uniform diffusion of the solvent through the coating toward the free surface thereof.

The temperature in the intermediate zone between the coating bath and the drying shaft may vary widely depending upon the nature of the lacquer being applied. For instance, when using a polyvinylidene lacquer the optimum temperature is from 80° C. to 90° C., which is from 10° C. to 20° C. higher than the temperature of the lacquer bath. On the other hand, when using nitro cellulose lacquer the optimum temperature of the zone, after the lacquer bath, is only a few degree higher than the temperature of the lacquer bath.

Since it has been found that the use of too high a temperature in the intermediate zone, for instance a temperature equal to or higher than that in the drying air, reduces the improved results in this invention, it is essential that the temperature in the intermediate zone, where excessive ventilation is avoided, be higher than that of the lacquer bath and lower than that of the heated drying air.

In addition to its application to the above-described method, the invention also relates to an apparatus for the coating of a film by said method, comprising a lacquer tank, and above the tank, a vertical shaft with connections for the circulation of heated drying air. Between the lacquer tank and the drying shaft the apparatus comprises a transition or intermediate section which is narrower than the drying shaft, the walls of said section being provided with heating elements.

The narrowed shape of said transition section has been found extremely efficacious for obtaining, immediately over the lacquer bath, a zone in which excessive ventilation is avoided and the vapor of the solvent may be present in a high concentration.

In said zone the temperature may be varied between wide limits with the aid of the heating elements.

The heating elements may be electric induction or resistance elements. It is preferred, however, on account of its greater simplicity and safety, to use a construction in which the walls are heated by vapor, steam or liquid carrying pipes.

The above-mentioned transition section effecting a separated zone is strongly promoted in its purpose according to the invention by so constructing it that it converges towards the drying shaft.

Finally, the invention relates to the film, and in particular to film having a basis of regenerated cellulose, e.g. cellophane film, which is provided with a coating according to the above-described method or with the aid of the above-described apparatus.

Said films show a very high homogenity and the number of defects in the form of porous spots or dull patches is substantially minimized as compared to prior art produced films.

To further illustrate the present invention, particularly with regard to a preferred form of apparatus suitable for practice of the process of this invention, reference is made to the accompanying drawing in which the single figure shows a sectional view of such apparatus.

In the figure numeral 1 denotes a tank containing a lacquer dissolved in solvent. Through this tank 1 a film 2 of regenerated cellulose is successively passed over roll 3, and under the rolls 4 and 5.

Excess coating on the film is removed therefrom by two doctor rolls 6 and 7, after which the film is transported vertically upwards through a converging section 8 by means of rolls (not shown) and subsequently through a drying shaft 10.

The section 8, which is narrower than the drying shaft 10 (partly shown) towards which is converges, is provided along its walls with a system of heating pipes 9 which are connected with a circulation system (not shown) for steam or hot water.

The converging section extends into the drying shaft 10. This drying shaft is connected to lines for the supply, discharge and reheating of hot air which is then circulated through the shaft. Only the discharge opening 11 is shown.

To further illustrate the present invention the following example is presented wherein all parts are by weight unless otherwise indicated.

*Example*

Employing the apparatus as shown in the drawing and described above, a regenerated cellulose (cellophane) film was coated with a polyvinylidene chloride lacquer, the lacquer being dissolved in a weight ratio of 1:7 in a mixture of 65% methyl ethyl ketone and 35% toluene and kept at a temperature of 70° C. in the lacquer bath.

Through the pipes 9 steam was passed at a rate such that in the intermediate section 8 a temperature of 85° C. was maintained.

In the drying shaft 10 heated air at 110° C. was caused to circulate in an amount sufficient to completely dry the film passing therethrough. In the discharge opening 11 of the drying shaft shown in the drawing, a concentration of 20 grams solvent/$m.^3$ air was measured, which concentration is considerably below the lower explosion limit of the methyl ethyl ketone vapor. The film thus coated at a rate of 150 meters/minute had a substantially smooth, homogeneous and clear appearance.

When the above process was repeated, while the temperature in the converging intermediate section was lowered to that of the lacquer bath, the coated film assumed a dull finish.

Obviously, many modifications and variations of the present invention are possible in the light of the above teachings. It is therefore to be understood that within the scope of the appended claims, the invention may be practiced otherwise than as specifically described.

What is claimed is:

1. In the continuous method for the coating of a film wherein the film is guided through a bath consisting of a lacquer solution and subsequently dried in a drying shaft by contact with heated circulating air, and which film after it has left the lacquer bath and before contact with the heated air is guided through an intermediate zone in which excessive ventilation is avoided and in which an atmosphere is maintained containing solvent vapor in a concentration higher than that maintained in the drying shaft, the improvement comprising maintaining the atmosphere in said zone at an adjustable temperature which is higher than that of the lacquer bath and lower than that of the heated drying air.

2. A method according to claim 1 wherein the film comprises regenerated cellulose.

3. A method according to claim 2 wherein the lacquer comprises polyvinylidene chloride.

4. A method according to claim 2 wherein the lacquer solution comprises polyvinylidene chloride dissolved in a mixture of methyl ethyl ketone and toluene at a temperature of 70° C. and the temperature of said intermediate zone is approximately 85° C.

References Cited by the Examiner

UNITED STATES PATENTS

| | | | |
|---|---|---|---|
| 1,662,816 | 3/1928 | Bigelow | 117—119.6 |
| 1,920,212 | 8/1933 | Payne et al. | 264—207 |
| 1,930,601 | 10/1933 | Townsend | 118—65 |
| 2,159,297 | 5/1939 | Shover | 118—65 |
| 3,049,446 | 8/1962 | Goldstein et al. | 117—64 |
| 3,097,106 | 7/1963 | Blout et al. | 117—64 |

ALFRED L. LEAVITT, *Primary Examiner.*

RICHARD D. NEVIUS, MORRIS KAPLAN,
*Assistant Examiners.*